(No Model.) 6 Sheets—Sheet 5.

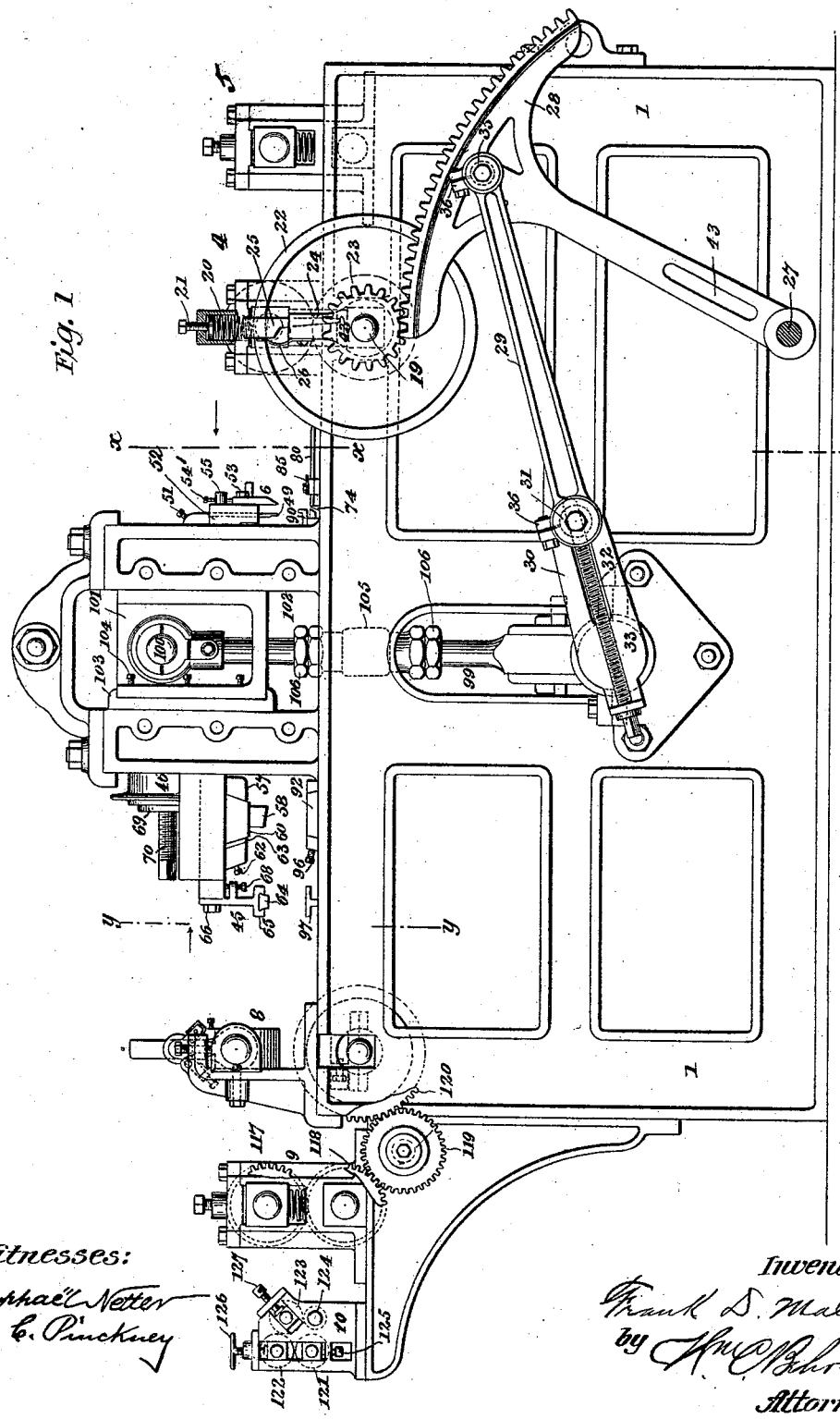

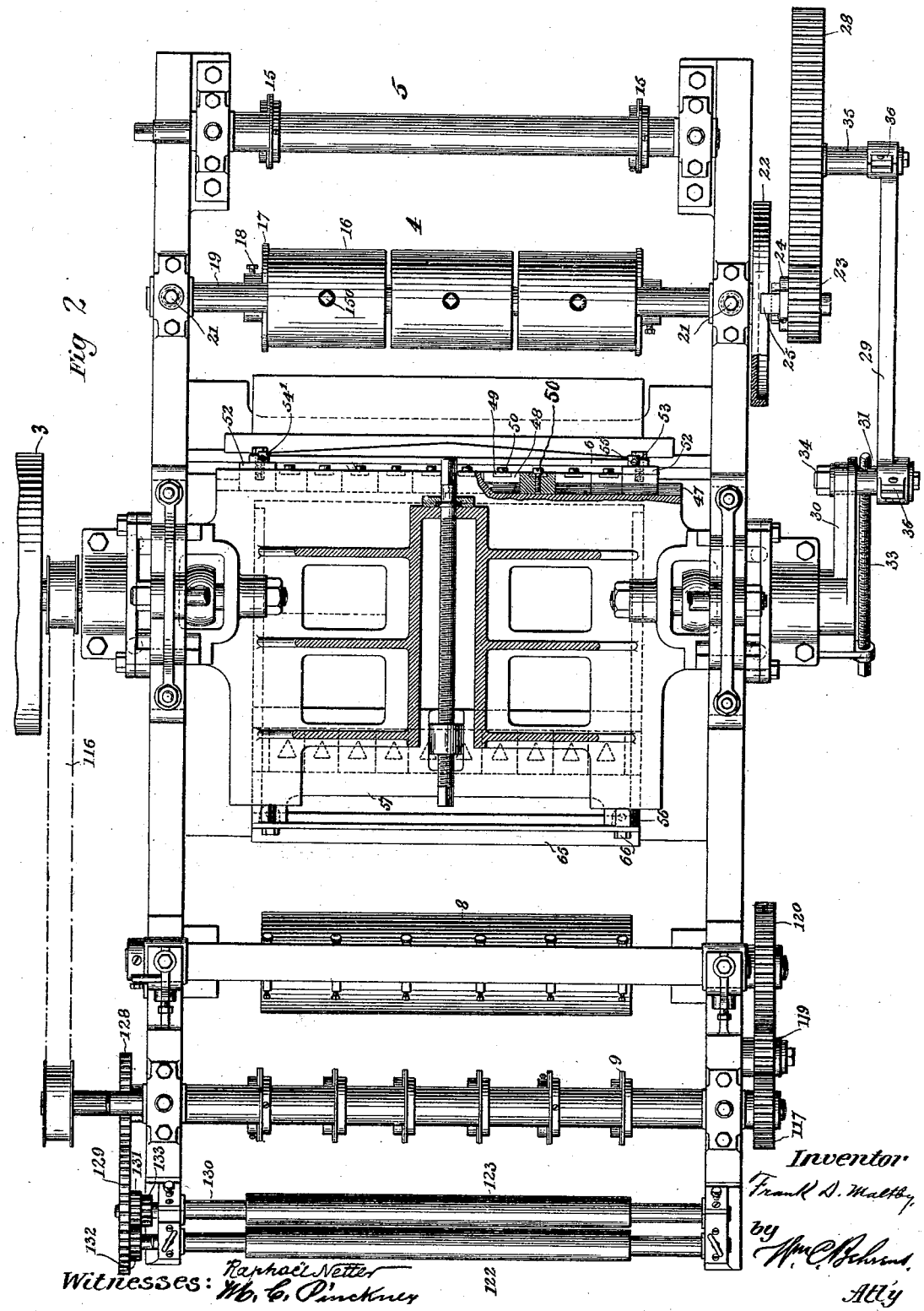

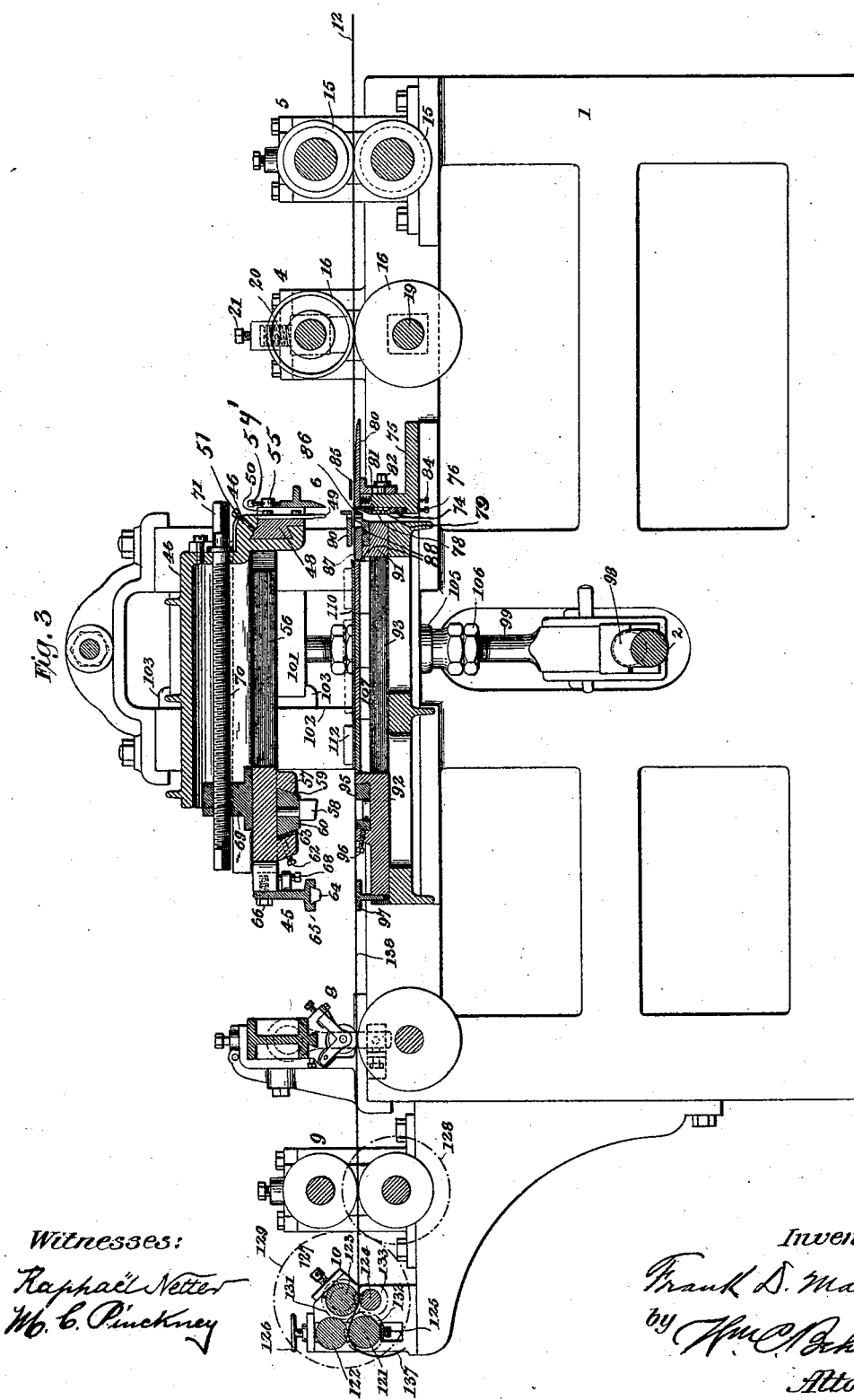

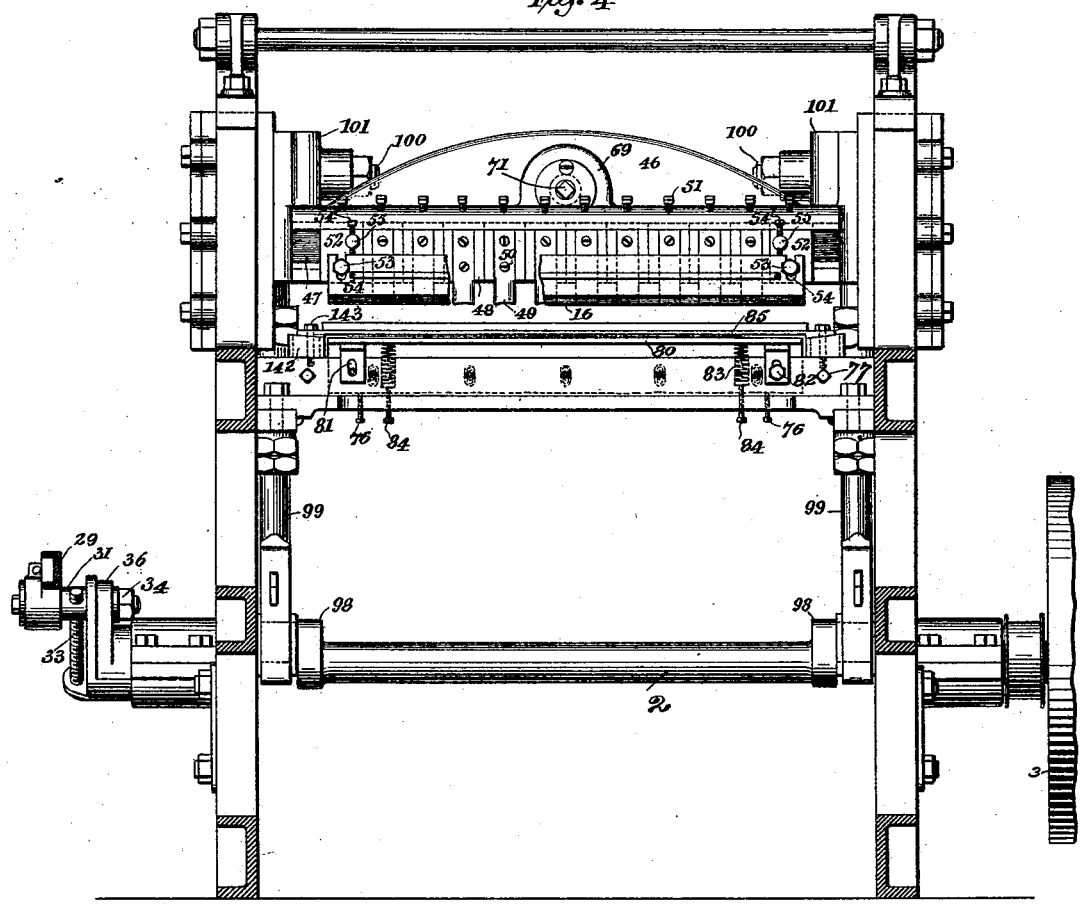
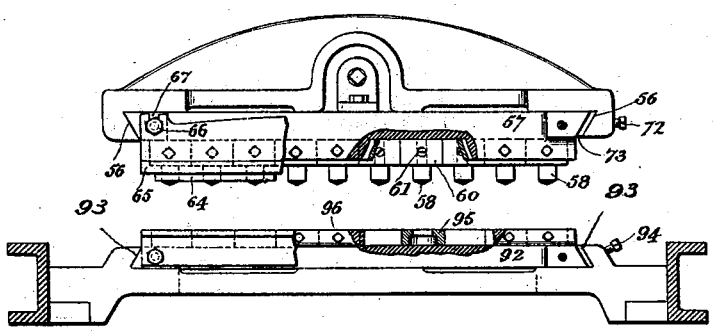

F. D. MALTBY.
MACHINE FOR CUTTING OUT CELL CASE BLANKS.

No. 517,651. Patented Apr. 3, 1894.

Witnesses:
Raphaël Netter
M. E. Pinckney

Inventor
Frank D. Maltby
by
Wm C. Ahrens
Attorney

THE NATIONAL LITHOGRAPHING COMPANY,
WASHINGTON, D. C.

(No Model.) 6 Sheets—Sheet 6.

F. D. MALTBY.
MACHINE FOR CUTTING OUT CELL CASE BLANKS.

No. 517,651. Patented Apr. 3, 1894.

Witnesses:
Raphail Netter
M. E. Pinckney

Inventor
Frank D. Maltby
by
Wm C. Behrand,
Attorney

THE NATIONAL LITHOGRAPHING COMPANY,
WASHINGTON, D. C.

UNITED STATES PATENT OFFICE.

FRANK D. MALTBY, OF ENGLEWOOD, NEW JERSEY, ASSIGNOR, BY MESNE ASSIGNMENTS, TO JAMES M. WHITNEY, OF BROOKLYN, NEW YORK.

MACHINE FOR CUTTING OUT CELL-CASE BLANKS.

SPECIFICATION forming part of Letters Patent No. 517,651, dated April 3, 1894.

Application filed December 16, 1891. Renewed October 11, 1893. Serial No. 487,887. (No model.)

*To all whom it may concern:*

Be it known that I, FRANK D. MALTBY, a citizen of the United States, and a resident of Englewood, in the county of Bergen and State of New Jersey, have invented certain new and useful Improvements in Machines for Making Paper Cells, Trays, Compartments, Boxes, &c., of which the following is a specification.

My invention relates to machines for making paper cells, trays, compartments, boxes, &c., and the objects of my invention are to enlarge the capacity of such machines, to improve their feeding, cutting, punching, stamping, curving and scoring mechanism; to provide an improved punch and die adjusting mechanism, and to improve this class of machines in many other particulars, as fully set forth in the specification. I accomplish these objects by the means hereinafter specifically and fully described and claimed.

Figure 6:
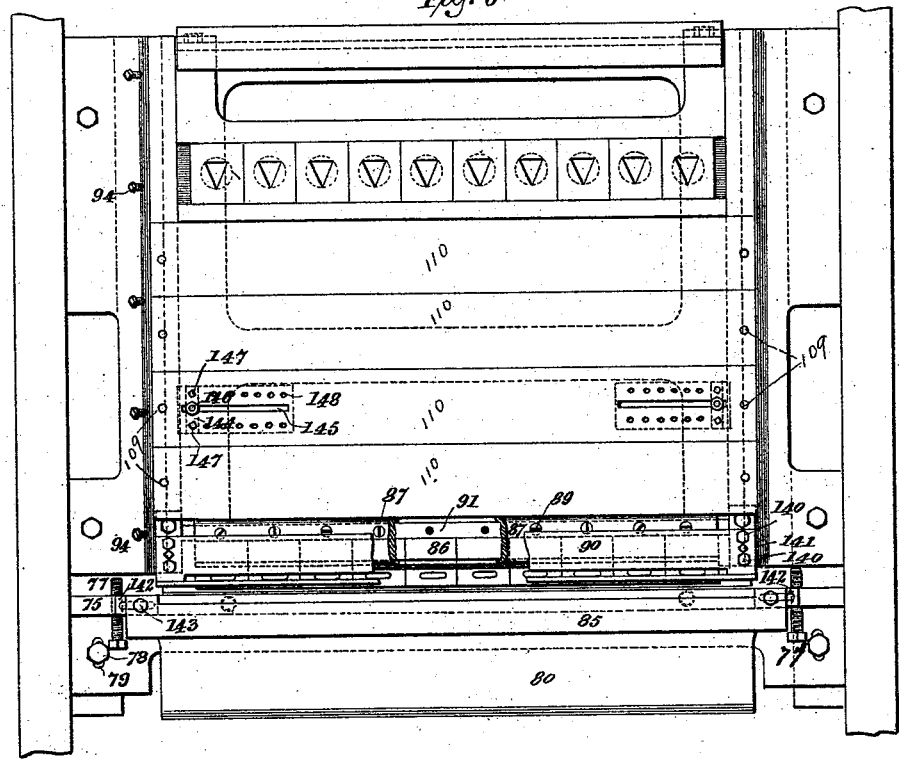
Figure 7:
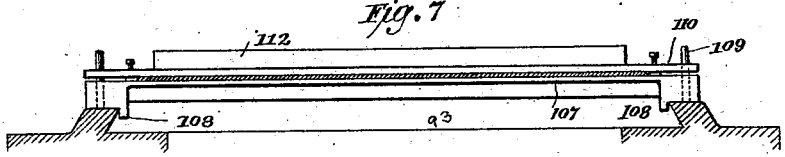
Figure 8:
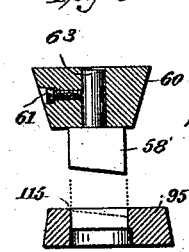
Figures 7A, 9:
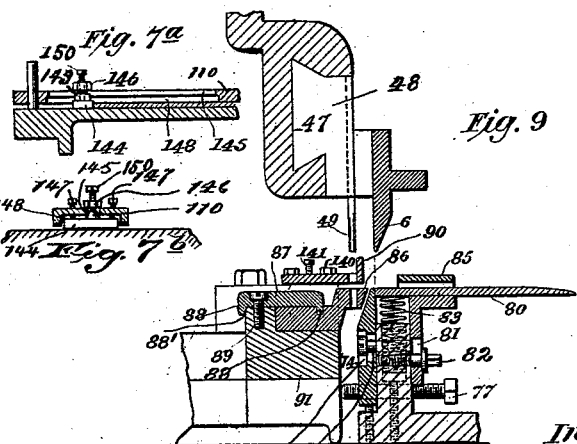
Figure 10:
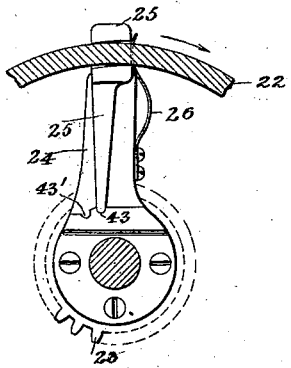
Figure 11:
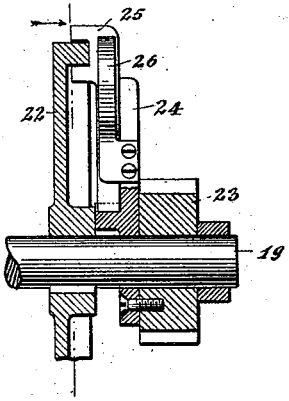
Figure 12:
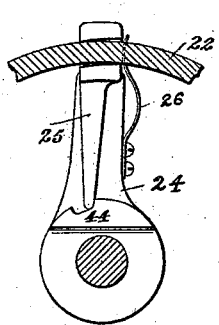
Figure 13:
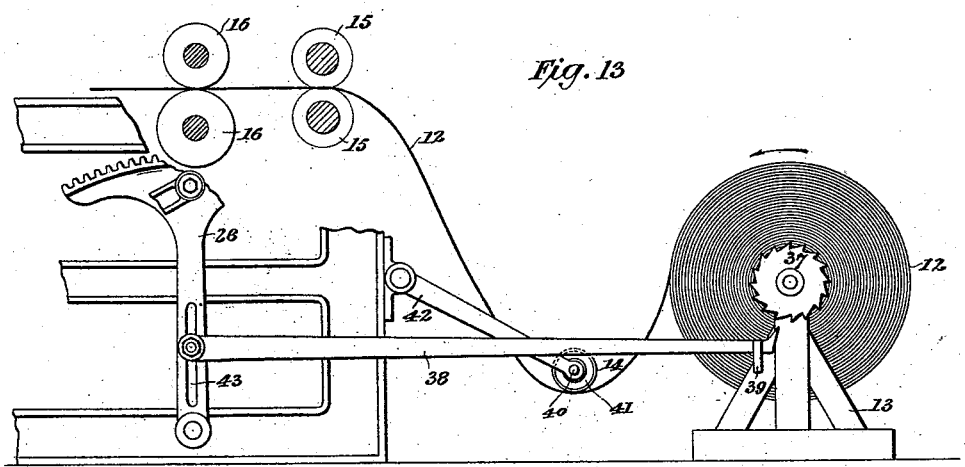
Figure 16:
Figure 14:
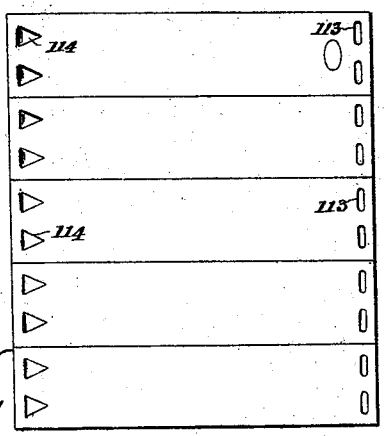
Figure 15:
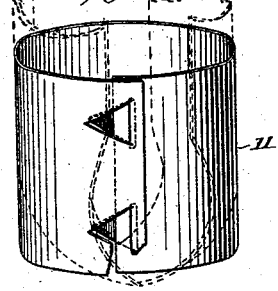

In the accompanying drawings forming part of this specification Figure 1 illustrates a side elevation of a machine embodying my invention. Fig. 2 is a plan view partly in section. Fig. 3 is a longitudinal sectional view. Fig. 4 is a transverse sectional view taken on line *x—x* of Fig. 1. Fig. 5 is a transverse sectional view taken on line *y—y* of Fig. 1. Fig. 6 is a plan view of the bed or lower platen, holding the two sets of dies. Figs. 7, 7ª and 7ᵇ illustrate the paper guiding means. Fig. 8 is a detail view of the punch and die for forming tongues in the paper. Fig. 9 illustrates the transverse cutter and the slotting punch and die. Figs. 10 and 11 represent details of the clutch mechanism forming part of the feed mechanism. Fig. 12 illustrates a modification of the clutch mechanism shown in Figs. 10 and 11. Fig. 13 illustrates another part of the paper feed mechanism. Fig. 14 illustrates the product of the machine as it emerges therefrom. Fig. 15 illustrates the cylindrical part of a cell, and Fig. 16 illustrates the strip forming the bottom of the same, the said strip being also shown in position in dotted lines in Fig. 15.

Referring to the drawings 1 is the frame of the machine constructed of iron or of any other suitable material in any approved manner. Journaled transversely in this frame is the main shaft 2 carrying the pulley 3 to which motion is imparted from any suitable source of power. Motion is transmitted by means of this shaft 2 to the several movable parts of the machine. These parts comprise a paper feed mechanism 4, a paper trimming mechanism 5, a transverse cutting or shearing mechanism 6, a punching mechanism with punches 49 and 58, a stamping mechanism 45, a scoring mechanism 8, a slitting or longitudinal cutting mechanism 9, and a curving or crimping mechanism 10.

In the machine illustrated in the drawings which is arranged to make cells 11 (see Fig. 15) for packing purposes, the strawboard or thick paper 12 from which the cells are manufactured is mounted in the form of a roll on a suitable standard or support 13. The paper passes from thence under a paper loosening or unwinding device 14 between the circular cutters 15 of the trimming mechanism to the rolls 16 of the paper feeding mechanism. These rolls or cylinders 16 are constructed in sections and are longitudinally adjustable on their shafts 19 by means of set screws 150 as shown in Fig. 2, the set screws being operated through openings in the cylinders. In the drawings I have shown the rolls constructed in three sections though a less or greater number could be employed. The flanged collars 17 secured by set screws 18 to the lower roller shaft are longitudinally adjustable the same as the sections of the rollers so as to accommodate paper of varying widths and to guide the same. If it should be necessary at times to use narrow paper one or more of the sections could be removed and the flanged collars brought correspondingly nearer to each other. The said feed rollers are mounted in suitable bearings on the frame of the machine, and the pressure of the same on each other is regulated by a spring 20 and pressure screw 21 the said spring pressing on the journal bearing of the upper roller which bearing slides in a vertical guide.

Secured to the lower shaft 19 of the feed rolls, is a flanged disk 22 (see Figs. 10 to 12) which forms one member of a clutch mechanism for imparting an intermittent movement to the feed rolls. Loosely mounted on shaft 19 is a pinion 23 which has firmly secured thereto an arm 24 which carries the clutch or grip 25. A spring 26 (see Fig. 11) secured to the arm 24 presses on the clutch and keeps it normally in contact with the flange of the disk. Mounted on a pivot 27 near the base of the frame is a toothed sector 28 which meshes with the pinion 23 of the clutch mechanism and transmits motion to the same. This sector is connected to the power shaft by a pitman 29 and crank 30. The crank pin 31 which connects the crank with the pitman is adjustable in the slot 32 of the crank arm.

To secure and facilitate an accurate adjustment of the crank pin in its arm so as to vary the extent of movement imparted to the sector I attach to the arm a threaded rod 33 which screws transversely through the crank pin as shown. When the clamping nut 34 is released the crank pin can be adjusted nicely at any desired point in the slot by turning the threaded rod in the proper direction in its bearing on the crank arm. When the desired point is reached the crank pin can be again clamped in place by its clamping nut. The nearer said crank pin is adjusted to the pivot of the crank the shorter will be the movement imparted to the sector 28, and the shorter will be the feed movement of the feed rolls. The connections of the pitman with the crank pin and stud 35 on sector are made by split bearings 36 adjustable by means of screws to take up wear.

In order to obviate the difficulties incident to the great inertia of a large roll of paper I have devised the following mechanism: I secure to the shaft of the paper roll a ratchet wheel 37 to which I impart motion to feed off the paper at times when required, by the following means: A push pawl 38 is connected in an adjustable manner, as shown, to the arm of the sector 28 and is arranged to rest at its outer end in a support or guide 39 in a manner that when the pawl only is reciprocated back and forth by the sector it shall clear the said ratchet wheel and have no effect thereon, but when raised up in line with the teeth thereon as presently described will act on said ratchet wheel to push it around and thus unwind a proportionate length of paper therefrom. This lifting I affect by means of a projection 40 on the end of the roll 41 mounted in arms 42 pivoted one to each side of the main frame as shown, in Fig. 13. This roll rests on the paper between the paper roll and the trimming rolls, being sufficiently heavy to depress the paper between said parts when the paper unwinds freely from the said paper roll or during the intermissions when the feed rolls are at rest. When the paper is being moved forward by the feed rolls it operates to lift the roll 41 and if the paper does not unwind freely from the paper roll the roll 41 is lifted sufficiently to cause its projection 40 to strike and lift the pawl so that as the latter is moved toward the ratchet wheel by the sector it will strike the ratchet wheel and give the paper roll a start and partail revolution and thus assist in overcoming the inertia of the same and facilitate the free movement of the paper. The amount of throw of the pawl can be regulated by shifting its connection with the sector arm up or down in the slot 43 provided therefor. The trimming cutters are, of course, not driven, being caused to revolve and cut by the action of the paper pulled through between the same by the movement of the feed rolls, their motion always commencing and ceasing with that of the feed rolls. Said cutters are adjustable in their shafts so as to cut the paper into any width desired. The grip or clutch 25 of the clutch mechanism rests at its lower end in a notch 43 of the clutch arm 24 the said notch being located outside of a straight line drawn from the center of the shaft to the point of gripping contact so that said grip or clutch and the clutch arm act like the members of a toggle-joint mechanism. As the clutch arm begins to move to the right (see Fig. 10) the grip being free does not instantly grip the flange of the disk, but does so as soon as it is sufficiently tilted to take a firm hold thereof, the notch 43, practically the joint of the toggle, being then nearer to the straight line joining center of shaft and gripping contact on flange. The clutch arm is provided with two notches in either one of which the grip may rest, the second notch 43' giving the grip more play before it takes hold of the flange. In Fig. 12 I have shown a modification having a wide notch 44 for the same purpose, the end of the grip being allowed to slip in the notch before it takes hold. The paper after having been fed forward is subjected to the transverse cutting, the punching and the stamping mechanism all of which act simultaneously. The upper platen 46 is provided with a dove-tail groove 47 in which the blocks 48 carrying the punches 49 secured thereto by screws 50 are arranged to slide for purposes of adjustment. The blocks 48 after adjustment are held in place by the clamping screws 51. A transverse cutter 6 is clamped upon two blocks 52 which are mounted at each end of the series of punches 48 and slide in the dovetailed groove 47 in the platen 46. Said blocks 52 extend out beyond the faces of the punches 48 so as to bring the cutter 46 in front of the punches 48, said cutter being secured to blocks 52 by screws 53 passing through slots 54 in said cutter. The vertical adjustment of said cutter is effected by the screws 54' which after passing through lugs 55 on the blocks abut against the upper edge of the cutter, assisting also in holding the latter in place. Formed in the upper platen 46 are the guideways 56 in which the punch holder 57 is arranged to slide so that it can be adjusted nearer to or farther from the punches 49. The punch holder is provided with a dove-tail groove 59 in which the blocks 60 holding the punches 58 can be adjusted. The punches 58 are held in the blocks 60 (see Fig. 8) by screws 61 and the blocks are secured in the groove by screws 62 which press against the interposed gib 63. A male stamping die 64 for impressing a name, date or address on the material operated on is mounted in the stamp holder 65, which latter is secured by clamping screws 66 to the punch holder 57, the clamping screws passing through open or elongated slots 67 in the stamp holder. Screws 68 passing through lugs near the ends of the stamp holder, abut against the under side of the punch holder and serve to regulate the proper adjustment of the stamping mechanism and to hold the same in adjusted position in connection with the screws 66.

As a means for securing a gradual adjustment of the punch 58 toward or from the punch 49 I form a screw threaded lug 69 on the punch holder through which I pass a screw threaded rod 70 journaled, as shown, at its other end in the platen 46. By applying a suitable handle to the squared end 71 of this rod I am enabled to adjust the punch 58 at any desired distance from the punch 49. To hold the sliding punch holder 57 in any adjusted position I use set screws 72 which abut against a gib 73 interposed to compensate for wear.

Referring again to the transverse cutting mechanism the movable shear thereof operates in connection with the stationary shear 74 (see Fig. 9) secured to the shear support 75 by means of a slot 79 and screw 78 connection as shown and adjustable by means of the screws 76. The shear support 75 is longitudinally adjustable on the bed plate, by set screws 77 which abut against the bed plate, while clamping screws 178 operating in slots 179 (see Fig. 6) of the cutter holder serve to clamp the same in any adjusted position. Arranged close to the stationary shear is the spring pressed table or guide 80 which is shown in its normal position in Fig. 9. This table is mounted on the shear support and is guided vertically thereon by means of slot 81, and flanged screw 82. As the upper shear descends it depresses this table 80 against the force of springs 83 (see Fig. 9) placed in cavities in the shear support which springs again elevate the table when the upper shear rises bringing the paper back to the proper level. The pressure of the springs can be regulated by means of screws 84. Over the table 80 is arranged the adjustable pressure plate and guide 85 which serves to hold the paper to the proper level. It is made adjustable vertically by wedge blocks 142 which pass under the ends of the same, see Fig. 4. A screw 143 holds each end and block in place.

Referring to the punching mechanism the dies 86 for the punches 49 (see Fig. 9) are clamped to a groove or offset in the die holder 91 by means of the clamping plate 87 formed with two tongues 88 one of which enters a groove in the dies and the other, which is slightly beveled at 88′, takes hold of the said holder at the back thus drawing the die back firmly to place. The plates are held in place by screws 89. Arranged at a suitable distance above the dies is the adjustable stripper plate 90 through which the punches pass before entering the dies. Vertical adjustment is effected by means of the clamping screws 140 and adjusting screws 141, the former passing freely through holes in the stripper and screwing into the die support, while the latter screws into the stripper and abuts against said support. This die holder 91 as well as the die holder 92 are arranged to slide in a guide way 93 formed in the bed, and after being adjusted in any desired position are held in place by set screws 94. The dies 95 are secured in the die holder 92 after adjustment by set screws 96. Fastened to projections from the die holder 92 is the female die plate 97 which co-operates with the stamping die 64.

Vertical movement is imparted to the platen 46 by the following means: The transverse driving shaft is provided with two cranks 98 to which the lower ends of two connecting rods 99 are connected. The upper ends of these rods are connected by wrist pins 100 with the projections 101 of the platen 46. These projections extend into vertical ways 102 of the main frame and serve to guide the platen in its up and down movements. Gibs 103 are used in connection with the projections 101 the adjustment for taking up wear being effected by screws 104 which pass through flanges in the projections and press against the gibs.

To regulate the depth of the downward movement of the punches I construct the connecting rods 99 in two sections the oppositely screw threaded ends of which pass into the connecting nut or sleeve 105 and are held in place by clamping nuts 106. According to the direction in which the sleeve 105 is revolved will the rod be shortened or lengthened and the depth to which the punches pass into the dies increased or decreased. When it is desired to adjust the punches 58 to a new position the upper platen is first depressed until the punches engage their respective dies, when, after loosening the set screws 72 and 94, the screw rod 70 is turned until the punches and dies have reached the determined position, the punches carrying the dies with them, and thus an accurate adjustment of both punches and dies is effected by the simple movement of the upper punch holder. The set screws 72 and 94 are then again tightened and the punches elevated to clear the dies and the punching mechanism is then ready to operate in its newly adjusted position. The space between the two sets of dies 86 and 95 is occupied by a removable sectional table 107 the sections of which are formed with guide projections 108 which fit closely between the guide ways of the die holder. I have shown four such sections in the drawings but a greater or less number may be used and they may be made of any desired width and of different widths as occasion may require. Each section of the table is provided with vertical pins 109 over which the paper guide and pressure plates 110 fit so as to be capable of moving up and down to accommodate paper of different thickness that may be guided between the same and the table. Guides 144 having square shanks 149 entering slots 145 (see Figs. 6, 7ª and 7ᵇ) serve to guide the edges of the paper. Each guide 144 is received in a recess or groove 148 formed in the under side of the pressure plate 110, and screws 147 tapped in said plate and abutting against said guide serve to adjust its projection below the bottom of said plate, the distance which the guides or guide blocks 144 project below the said plate determining the distance which the plates shall be above the table. Screws 146 entering the square shanks 149 formed on the guide blocks are provided with clamping or set nuts 150, and by means of these screws and nuts the guides are held in any desired position of adjustment. In practice each pressure plate will be provided at each end with one of these vertically adjustable guides.

To hold the paper down and guide it properly I place on each one of the pressure plates a weight 112 which may be greater or less according to the character of the paper operated upon. With the particular punches illustrated in the drawings elongated slots 113 and tongues 114 are punched in the paper (see Fig. 14) the tongues when inserted in the slots forming a cell as illustrated in Fig. 15. The punch and die 58, 95 for forming the tongue are of a triangular shape, cutting on two sides and indenting only on the third. This indenting is accomplished by rounding the die at 115, see Fig. 8, so that the punch simply indents or scores the material at this edge instead of cutting it so that the tongue will bend at that point before it will tear out in case of careless handling.

Arranged beyond the punching mechanism are the scoring cutters 8 as many cutters being employed as may be required. As I do not lay any claim to the specific construction of the scoring mechanism and as I employ a well known construction, a specific description of the same is unnecessary.

Following the scoring mechanism are the slitting cutters 9 which cut the paper operated on into as many pieces as required. These cutters are longitudinally adjustable on their shafts by set screws as shown. Motion is imparted to the lower shaft of the slitting cutters by a belt 116 connecting said shaft with the main shaft. Said cutter shafts are geared together at their opposite ends by gear wheels 117, 118 and motion is transmitted from the latter gear to the gear 120 on the shaft of the cylinder of the scoring mechanism through the intermediate gear 119 mounted on the side of the frame.

At the end of the machine the bending or curving mechanism is arranged. The same consists of the rolls 121, 122, and 123 mounted in movable bearings and the roll 124 mounted in a stationary bearing. The latter roll is arranged in the plane of the movement of the paper and in connection with the roll 123 serves to feed the paper to the rolls 121 and 122. In practice the lower roll 121 is adjusted to the height by the set screw 125 and then the upper roll is adjusted to the proper distance therefrom by the adjusting screw 126 the said screw engaging the journal bearing of the said roll. The distance of roll 123 from roll 124 is regulated by the adjusting screw 127. Motion is transmitted to the curving mechanism by the gear wheel 128 on the lower shaft of the slitting mechanism which meshes with gear 129 on the shaft 130 of roll 123. Said shaft is provided with a pinion 131 which meshes with pinions 132 and 133 on the shafts of rolls 121 and 124 respectively. Between the punches and scoring cutters, between the latter and the slitting cutters, and between the last named and the curving rolls the table and pressure plates as before described are continued to properly guide the paper through the machine, but for the sake of clearness in the drawings they have been omittted therefrom.

The operation of the machine when making the product shown in Fig. 15 is as follows: The paper or strawboard 12 is passed from its roll between the trimming cutters to the feed rolls where intermittent motion is imparted to the same as heretofore described. As the paper passes between the trimming cutters it is trimmed to the proper width determined by the distance the trimming cutters are adjusted from each other. The method of feeding the paper has been already fully described. When the paper has been advanced the proper distance, the shearing mechanism 6, the punching mechanism with punches 49 and 58, and the stamping mechanism all operate simultaneously to shear off the paper, to punch the slots 134 and the tongues 135 in the paper and to stamp thereon at 136 whatever name or address may be desired. As the platen descends the movable shear blade cuts across the paper and in its descent depresses the table carrying with it the paper resting thereon. As the platen rises the table is elevated again by the spring and the paper pressed against the pressure plate or guide 85 to again bring it in line with the piece that was cut off and operated on by the punches. A second revolution of the main shaft causes the feed rolls to act again to feed the paper, the piece of paper or straw-board previously cut off being pushed forward on the table under the guide and pressure plates by the paper behind it impelled by the feed rolls. The feeding continues until the proper length of paper has been fed forward when it ceases and the shears and punches again descend to operate on the second piece of paper in the manner before described. The first piece of paper has meanwhile been advanced by the second piece of paper behind it to be acted upon by the slitting cutters and the curving rollers, the scoring mechanism not being used in making the cylindrical part of the cell referred to. The slitting cutters divide the sheet longitudinally into as many pieces as desired, each one of said pieces forming a cylinder. For every revolution of the main shaft, therefore, a number of these cylinders are produced. After passing the cutters the pieces are given the proper curve by the curving rolls, the paper being shown emerging from the machine at 137. When the machine produces the blank shown in Fig. 16 the punches 49 and 58 with their dies are removed and instead of the latter punches and dies are substituted punches and dies of triangular and diamond shapes and the position of the same adjusted to cut correspondingly shaped pieces out of the paper so that when the latter is finally slitted into a number of pieces each piece will have its sides cut out as shown in Fig. 16. In producing this blank the scoring cutters are brought into operation scoring the paper on lines 139 as shown. In cases where the curving rolls are not needed they are adjusted until the paper can pass through on a straight line.

The machine can be used to produce a great variety of paper articles since it is equipped with feeding, shearing, punching, scoring, slitting and curving mechanism, some or all of which may be employed in producing an article. Any shape or configuration of punches may be substituted for those shown or only one punch or set of punches may be used instead of the two sets shown. I can substitute for the punch 58 and its holder a large circular punch the square sides of which can slide in the guides 56 and punch out large circular disks, thus using only the trimming, feeding, shearing and punching mechanisms of the machine.

Having thus described my invention, what I claim, and desire to secure by United States Letters Patent, is—

1. The combination with the paper feed rolls of the paper carrying roll provided with a ratchet wheel, a reciprocating pawl operated by the machine, and a swinging roll resting on the paper and arranged to lift said reciprocating pawl into engagement with the ratchet wheel, to turn the same to unwind the paper, substantially as described.

2. The combination with the transverse shearing cutters, of a table arranged close to the lower cutter and in the path of the upper one, supporting springs for said table, means for varying the pressure of said springs, and a pressure plate or guide, substantially as described.

3. The combination with the transverse shearing cutters, of an adjustable table arranged close to the lower cutter and in the path of the upper one, supporting springs for said table, means for varying the pressure of said springs, and an adjustable pressure plate or guide, substantially as described.

4. The combination with the transverse shearing cutters, of the spring supported table, the pressure plate, and the wedge blocks for vertically adjusting the same, substantially as described.

5. The combination with the adjustable transverse shearing cutters, of the stationary shear holder adjustable on the bed, the adjustable spring pressed table, and the adjustable pressure plate, substantially as described.

6. The combination with the slotting punch and die of the die holder and the tongued clamping blocks having one tongue beveled to clamp the dies firmly in place, substantially as described.

7. The combination with the slotting punch and die and its adjustable stripper and guide of the shearing cutters, the spring pressed table arranged on a level with the stationary shear and slotting die, and the adjustable pressure plate and guide, substantially as described.

8. The combination with the bed provided with a stationary and a longitudinally movable die holder of an intermediate removable table made in sections, substantially as described.

9. The combination with the bed provided with a longitudinal guide way and dies which are adjustable lengthwise of said bed in said guide-way, of a movable sectional table, the sections of which are fitted to said guide-way, said sections being disconnected from each other so that they may be separately removed or replaced when it is desired to lengthen or shorten the said table, substantially as described.

10. The combination with a table, of a pressure plate mounted on said table and provided at its under side with a recess or groove, as 148, of a guide block arranged in said recess or groove, and adjustable vertically relative to said pressure plate, adjusting screws for determining the projection of the said block below said pressure plate, and a clamping nut and screw for securing the same in adjusted position.

Signed at New York, in the county of New York and State of New York, this 30th day of October, A. D. 1891.

FRANK D. MALTBY.

Witnesses:
J. E. M. BOWEN,
M. C. PINCKNEY.